US006957090B2

(12) United States Patent
Lejman et al.

(10) Patent No.: US 6,957,090 B2
(45) Date of Patent: Oct. 18, 2005

(54) HANDS-FREE CAR KIT

(75) Inventors: Andrew Glenn Lejman, Lafayette, CO (US); John Steven, Highland Ranch, CO (US)

(73) Assignee: Kyocera Wireless Corp., San Diego, CA (US)

( * ) Notice: Subject to any disclaimer, the term of this patent is extended or adjusted under 35 U.S.C. 154(b) by 547 days.

(21) Appl. No.: 10/094,029

(22) Filed: Mar. 8, 2002

(65) Prior Publication Data

US 2004/0192403 A1 Sep. 30, 2004

(51) Int. Cl.[7] .............................................. H04M 1/00

(52) U.S. Cl. .............................. 455/569.1; 455/569.2; 455/575.1; 455/575.2; 455/575.9; 379/420.04; 379/433.05; 379/438

(58) Field of Search ............................ 455/575.9, 557, 455/41.1, 556.1, 575.1–575.2, 569.1–569.2; 379/430, 420.04, 433.05, 438

(56) References Cited

U.S. PATENT DOCUMENTS

| | | | | |
|---|---|---|---|---|
| 4,403,341 A | * | 9/1983 | Hata | 455/100 |
| 5,394,467 A | * | 2/1995 | Kepley et al. | 379/438 |
| 5,487,182 A | * | 1/1996 | Hansson | 455/569.1 |
| 5,519,756 A | * | 5/1996 | Clift | 379/44 |
| 5,588,041 A | * | 12/1996 | Meyer et al. | 455/569.2 |
| 5,610,971 A | * | 3/1997 | Vandivier | 455/569.2 |
| 5,659,888 A | * | 8/1997 | Kato et al. | 455/575.7 |
| 5,749,057 A | * | 5/1998 | Takagi | 455/569.2 |
| 5,978,458 A | * | 11/1999 | Vogl et al. | 379/143 |
| 6,049,701 A | * | 4/2000 | Sparksman | 455/74.1 |
| 6,067,014 A | * | 5/2000 | Wilson | 340/540 |
| 6,088,448 A | * | 7/2000 | Poirel | 379/438 |
| 6,115,620 A | * | 9/2000 | Colonna et al. | 455/569.1 |
| 6,154,663 A | * | 11/2000 | Itamochi | 455/569.2 |
| 6,230,029 B1 | * | 5/2001 | Hahn et al. | 455/575.2 |
| 6,236,868 B1 | * | 5/2001 | Lygas | 455/569.2 |
| 6,256,519 B1 | * | 7/2001 | Newton | 455/572 |
| 6,282,288 B1 | * | 8/2001 | Liao | 379/438 |
| 6,341,218 B1 | * | 1/2002 | Poplawsky et al. | 455/569.1 |
| 6,424,820 B1 | * | 7/2002 | Burdick et al. | 455/41.1 |
| 6,512,826 B1 | * | 1/2003 | Kim | 379/420.04 |
| 6,526,142 B1 | * | 2/2003 | Fan | 379/420.04 |
| 6,532,374 B1 | * | 3/2003 | Chennakeshu et al. | 455/569.1 |
| 6,542,606 B1 | * | 4/2003 | Lehtinen et al. | 379/433.05 |
| 6,704,585 B1 | * | 3/2004 | Hiebel | 455/575.3 |
| 6,735,453 B1 | * | 5/2004 | Bobisuthi et al. | 455/575.2 |
| 2002/0173348 A1 | * | 11/2002 | Chen | 455/569 |
| 2004/0102227 A1 | * | 5/2004 | Schlegel | 455/569.1 |

* cited by examiner

*Primary Examiner*—William Trost
*Assistant Examiner*—Sharad Rampuria

(57) ABSTRACT

The hands-free car kit allows a mobile handset to enter and exit privacy mode without the user having to press a privacy button. The simple act of picking up the mobile handset out of its cradle switches the hands-free car kit from hands-free mode to privacy mode. When the mobile handset is installed in the cradle the hands-free car kit enters hands-free mode. If the mobile handset is removed from the cradle the hands-free car kit enters privacy mode.

5 Claims, 7 Drawing Sheets

HANDS-FREE CAR KIT

FIELD

The present invention relates generally to electronic communications devices, and more particularly to mobile hand held communications devices.

BACKGROUND

Mobile communications devices are increasingly popular in our society. It is popular to talk on mobile handsets while driving. Many users of mobile handsets would like a simple and convenient way to make a mobile telephone call easily while driving. One attempt to solve this problem is a hands-fee car kit.

A hands-free car kit is an electronic device, which will enable a person to have a conversation on a mobile call without having to hold a mobile handset. The hands-free car kit is a speaker that is loud enough to be heard from several feet away and over the noise of a typical car, combined with a microphone designed to receive a human voice from several feet away. Typically the microphone has some filtering function for filtering out common noises of a car. The hands-free car kit may include a cradle for holding the mobile handset. Many hands-free car kits also supply power to the mobile handset.

Some hands free car kits allow the user to push a button on the unit to operate in privacy mode. Privacy mode allows the user to switch modes so that the mobile handset microphone and speaker are active and the hands-free car kit microphone and speaker are deactivated. This prevents others in the car from hearing what the caller is saying to the person in the vehicle. If the hands-free car kit microphone and speaker are active the unit is in hands-free mode.

While many hands-free car kits are external to the mobile handset, it will be clear to one of skill in the art that a mobile handset could have a hands-free car kit mode. In hands-free car kit mode the mobile handset would have a built in speaker loud enough to be heard from several feet away and a microphone designed to receive a human voice from several feet away.

On many current hands-free car kits with privacy mode, if privacy becomes an issue, the user is required to engage a switch known as a privacy button and pick up the mobile handset for normal use. The reason that a person uses a hands free car kit is to minimize the complexity of operating a mobile handset while driving. Pushing a button to enter and exit privacy mode adds unnecessary complexity to the task of conducting a mobile call while driving.

Some hands-free car kits enter privacy mode automatically when the user picks up the mobile handset by using a mechanical switch. When a mechanical switch is used the switch is typically placed in the cradle, requiring wiring to be placed in the cradle. Additionally, a mechanically switch can more easily become contaminated and fail to function properly.

SUMMARY

The object of the present invention is to provide an easy to use hands-free car kit. Briefly, the hands-free car kit allows a mobile handset to enter and exit privacy mode without the user having to press a privacy button. The simple act of picking up the mobile handset out of its cradle switches the hands-free car kit from hands-free mode to privacy mode. When the mobile handset is installed in the cradle the hands-free car kit enters hands-free mode. If the mobile handset is removed from the cradle the hands-free car kit enters privacy mode.

BRIEF DESCRIPTION OF THE DRAWINGS AND TABLES

For a more complete understanding of the present invention and the advantages thereof, reference is now made to the following descriptions taken in conjunction with the accompanying drawings, in which.

Use of the same reference symbols in different figures indicates similar or identical items.

DETAILED DESCRIPTION

Figure 1:
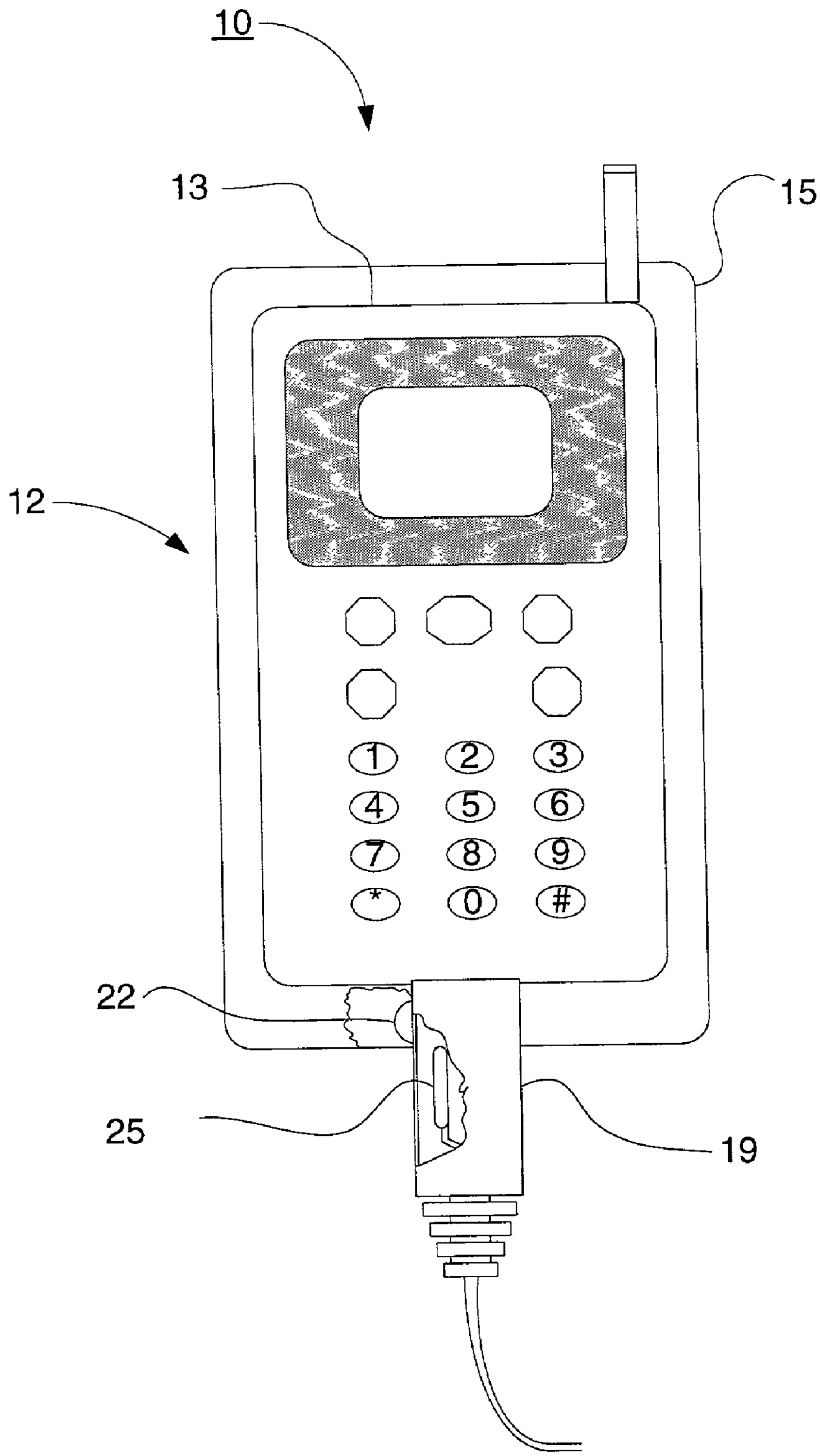
FIG. 1 is an illustration of a mobile handset installed in the cradle of a hands-free car kit with the magnet in the cradle and the reed switch in the power cord.

FIG. 1 shows one embodiment of the hands-free car kit 10. The hands-free car kit includes a cradle 15. The cradle 15 is adapted to hold a mobile handset 13. A magnet 22 is located in the cradle 15. A reed switch 25 is located in a power cord 19 for the mobile handset 13. When the mobile handset 13 is installed in the cradle 15 the magnet 22 is in close proximity to the reed switch 25. The reed switch 25 has two small metal leaves inside known as reeds. Each leaf is attached at one end and there is a slight separation between the two in the middle. When the reed switch is placed in a magnetic field, the field pulls the two leaves together completing the circuit. When the reed switch is closed, circuitry in the hands-free car kit 10 places the unit in hands-free mode. Conversely, when the switch is open, circuitry in the hands-free car kit 10 places the unit in privacy mode. Such circuitry is well known in the art. In FIG. 1 the mobile handset 13 lays flat in the cradle 15, however, it will be clear to one of skill in the art that other mobile handset 13 and cradle 15 configurations are possible. The reed switch 25 will be discussed in further detail with respect to FIG. 7. FIG. 1 shows an embodiment using a reed switch 25, however it will be clear to a person skilled in the art that any magnetic sensor can be used. A magnetic field sensor is any device that sense a magnetic field, examples include a reed switch or a hall effect sensor.

It will be appreciated by one skilled in the art that a reed switch that opens when in a magnetic field can be used. In this embodiment circuitry contained in the hands-free car kit would place the unit in privacy mode when the reed switch is closed and in hands-free mode when the reed switch is open.

The orientation of the magnetic field is important. Depending on the relative position of the reed switch and the magnetic field the magnetic field will either open or close the reed switch. Additionally the proximity of the magnetic field is also important. The stronger the magnet is the further away the reed switch can be from the magnet.

One skilled in the art will appreciate that the embodiment shown in FIG. 1 is one example of the present invention. Many different placements are possible. Several different placements are shown in FIG. 1, and FIGS. 3–6. These embodiments are meant to show several example placements and are not meant to be exhaustive.

In another embodiment of the present invention, not shown, the magnet is separate from the hands-free car kit 10. In this example the magnet can be attached to an area where the hands-free car kit 10 is placed such that when the mobile handset 13 is in the cradle 15 the contacts inside the reed switch 25 are closed. In a similar example a cradle 15 is not used. In this embodiment the reed switch 25 is in the power cord 19. A separate magnet, not shown in the figure, is placed near the cup holder in a vehicle. When the user places the mobile handset 13 and power cord 19 in the cup holder the separate magnet closes the reed switch 25.

It will be appreciated by one skilled in the art that the figures are for illustrative proposes only. The exact orientation of the magnet 22 and the reed switch 25 will depend on the magnet 22 and reed switch 25 that are chosen. For example, a stronger magnet allows the reed switch to be placed farther away from the magnet.

Figure 2:
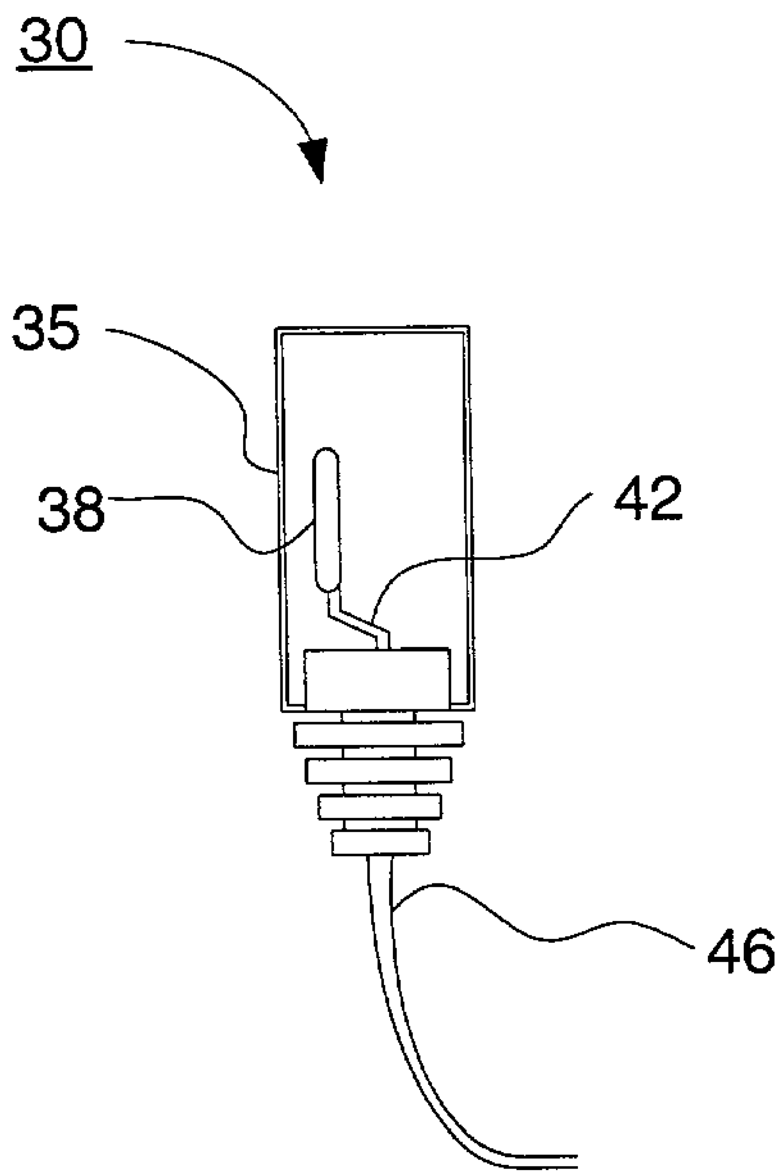
FIG. 2 is an illustration showing a cut away view of the power cord.

Referring now to FIG. 2, a cut away view of the power cord 30 is shown. The power cord is made up of the power cord connector case 35, the reed switch 38, the reed switch connections 42, and the power cord wire 46.

Figure 3:
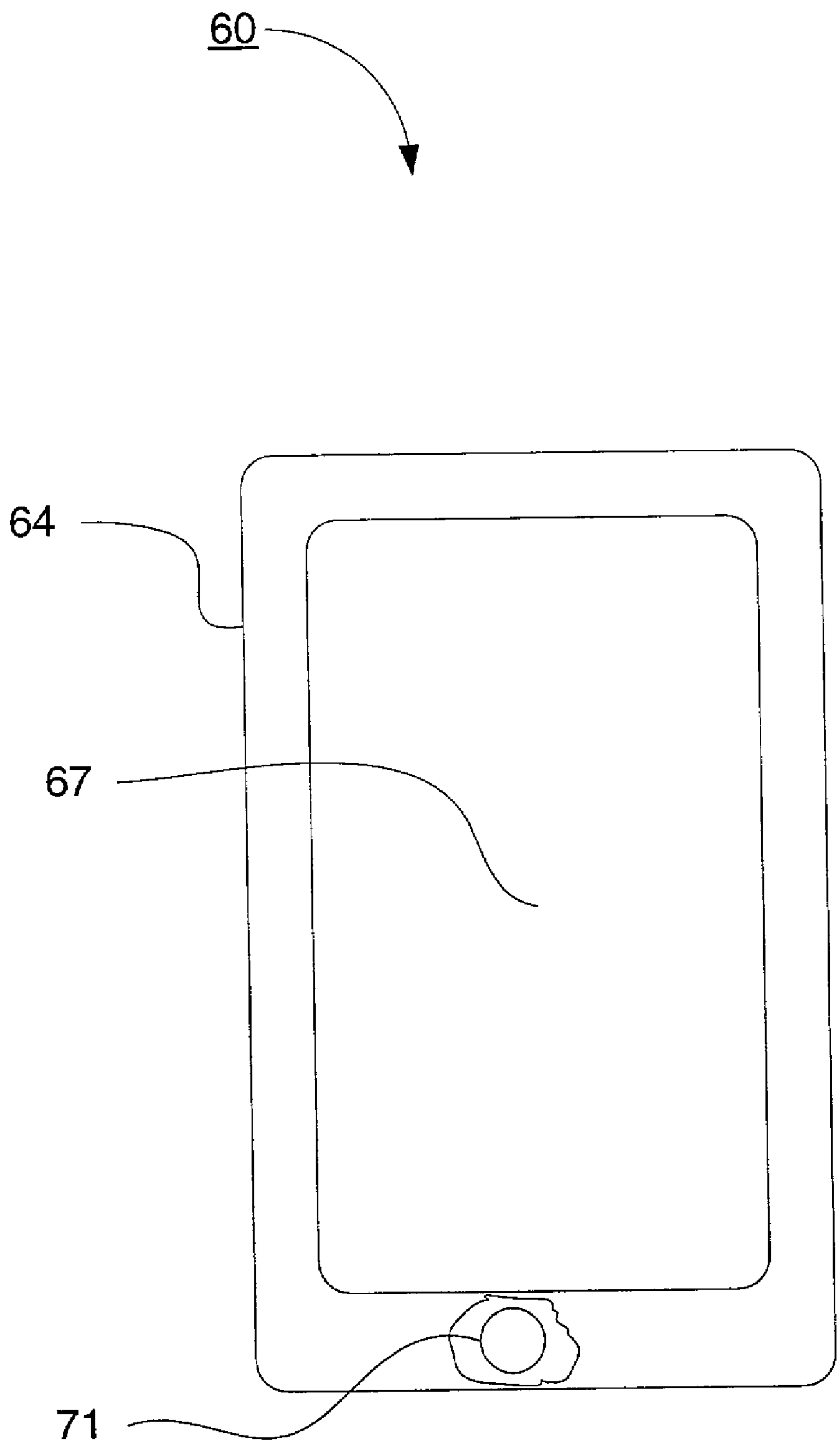
FIG. 3 is an illustration showing a cut away view of the cradle.

Referring now to FIG. 3, the cradle 60 will now be described. The cradle 60 has an outside wall 64 and a cradle mobile handset receiving area 67. The cradle also contains a magnet. When the mobile handset 13 is placed into the cradle 60 the magnet 22 will cause the reed switch 25 to close.

Figure 4:
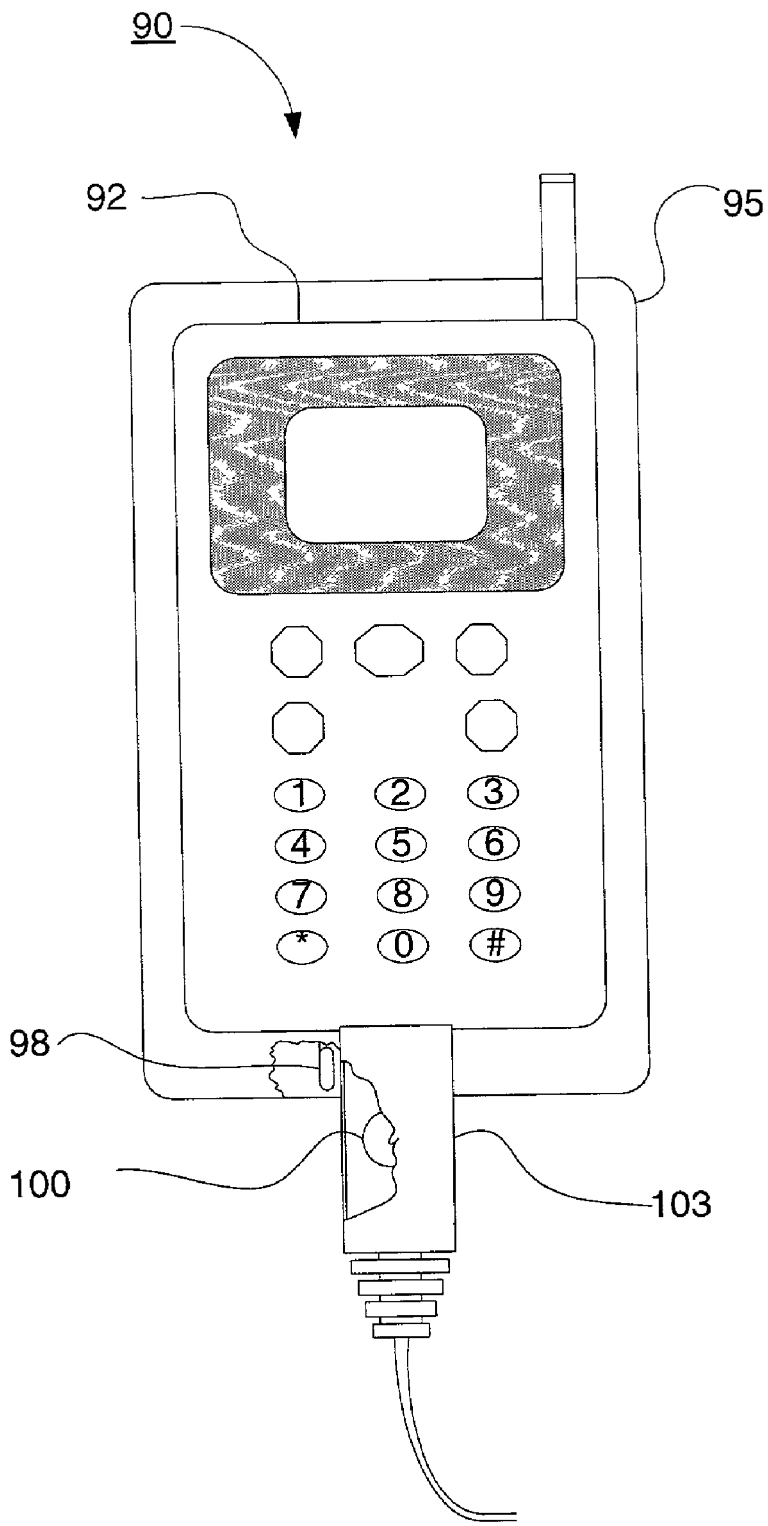
FIG. 4 is an illustration of a mobile handset installed in the cradle of a hands-free car kit with the magnet in the power cord and the reed switch in the cradle.

Referring now to FIG. 4, another embodiment of the hands-free car kit 90 will be discussed. FIG. 4 includes a reed switch 98 that is in the cradle 95, a magnet 100 that is in the power cord 103, and a mobile handset 92. Placing the reed switch in the cradle 95 would require the cradle 95 to have some form of connection between the cradle and the hands-free car kit 90 speaker and microphone (not shown). The embodiment shown in FIG. 4 would be less optimal, because the cradle 95 would be required to have circuitry and wiring adapted to determine the state of the reed switch 98. In FIG. 1 the wiring and circuitry for the reed switch can be build into the power cord. The cradle 15 of FIG. 1 does not require any external connections. It is simply a holder for the mobile handset 13 of FIG. 1.

Figure 5:
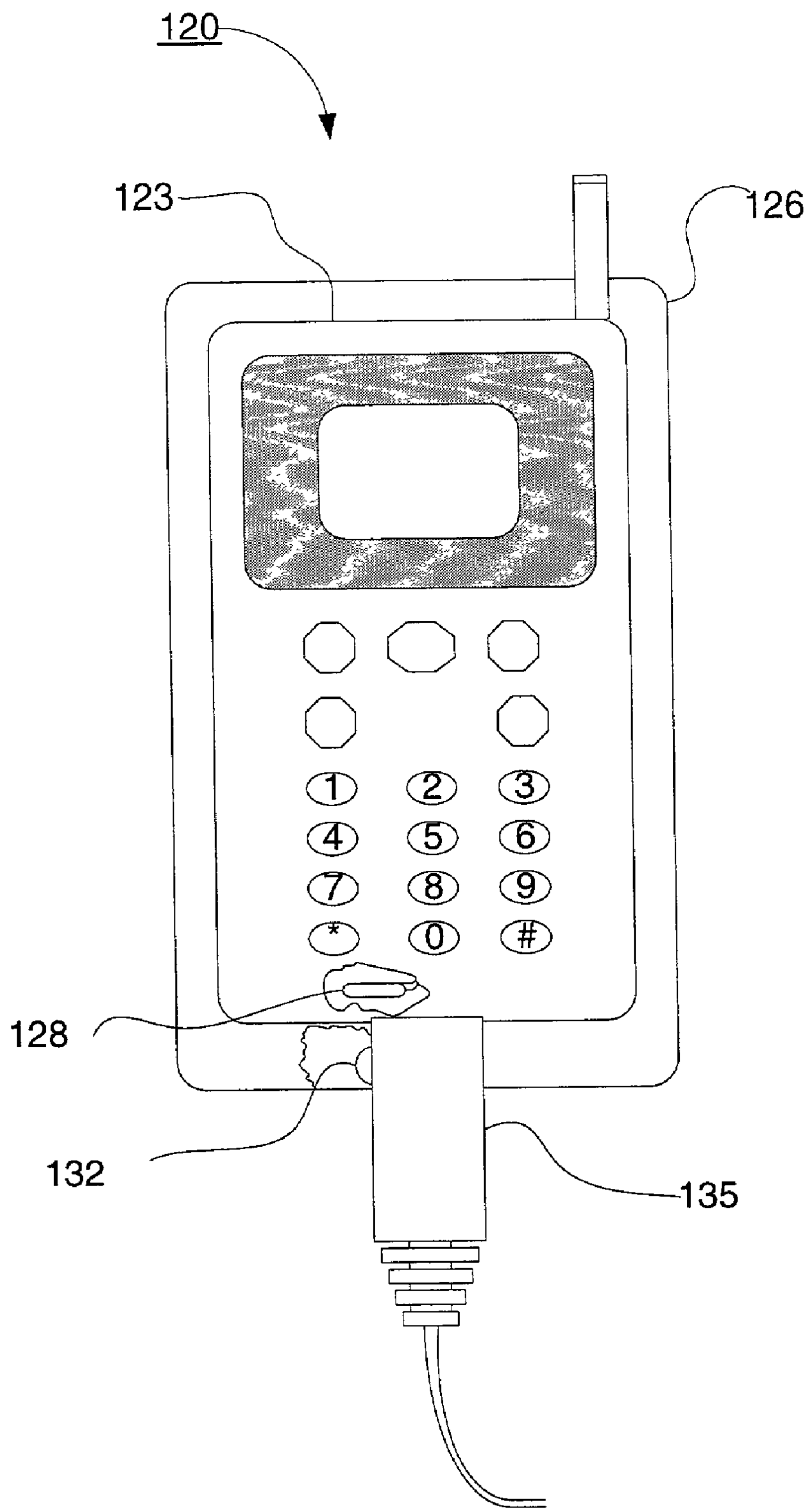
FIG. 5 is an illustration of a mobile handset installed in the cradle of a hands-free car kit with the magnet in the cradle and the reed switch in the mobile hand set.

Referring now to FIG. 5, another embodiment of the hands-free car kit 120 will be discussed. FIG. 5 includes a reed switch 128 that is in the mobile handset 123, a magnet 132 that is in the cradle 126, and a power cord 135. Placing the reed switch in the mobile handset 123 adds complexity to the mobile handset 123.

While FIG. 5 shows a possible alternative embodiment of the present invention, the reed switch 128 would be required to be installed in all mobile handsets 123, even mobile handsets that are never connected to a hands-free car kit. The cost of the reed switch 128 would have to be included in every mobile handset 123 instead of just the car kits that are sold. However in some cases it may be advantageous to place the reed switch 128 in the mobile handset 123 as described below.

It will be clear to one skilled in the art that the reed switch 128 can be placed in the handset for use with the separate magnet example above. In one embodiment the reed switch is placed opposite the power cord 135 so that mobile handset 120 can more easily be placed in the cup holder of a vehicle. In this example the end of the mobile handset 120 with the reed switch 128 is placed in a cup holder that has the external magnet attached. The opposite end of the mobile handset 123 can have the power cord 135 attached and the power cord 135 would not interfere with placement of the mobile handset into the cup holder.

Figure 6:
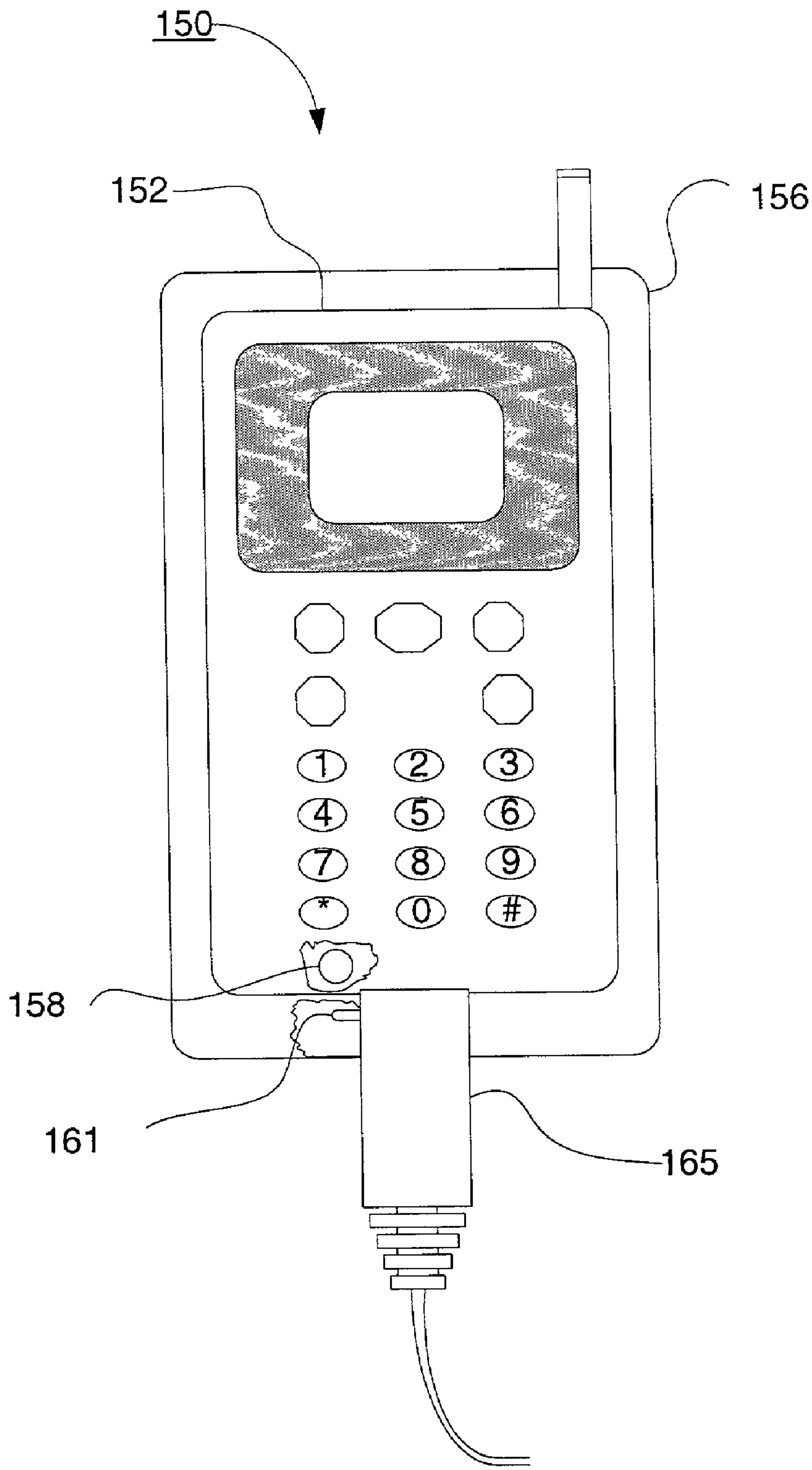
FIG. 6 is an illustration of a mobile handset installed in the cradle of a hands-free car kit with the magnet in the mobile handset and the reed switch in the power cord.

FIG. 6, shows an embodiment of the hands-free car kit 150 including a mobile handset 152 with a magnet 158 installed within the mobile handset 152. The mobile handset has been placed in the cradle 156 and the cradle 156 contains a reed switch 161. The power cord 165 is connected to the mobile handset 152.

As shown in the embodiment of FIG. 4, FIG. 6 would be less optimal, because the cradle 156 would be required to have circuitry and wiring adapted to determine the state of the reed switch. In FIG. 1 the wiring and circuitry for the reed switch can be build into the power cord. The cradle 15 of FIG. 1 does not require any external connections. It is simply a holder for the mobile handset 13 of FIG. 1. Additionally, in the embodiment shown in FIG. 6, a magnet 158 would be required in every mobile handset 152, even mobile handsets that are not used with a hands free car kit.

Figure 7:
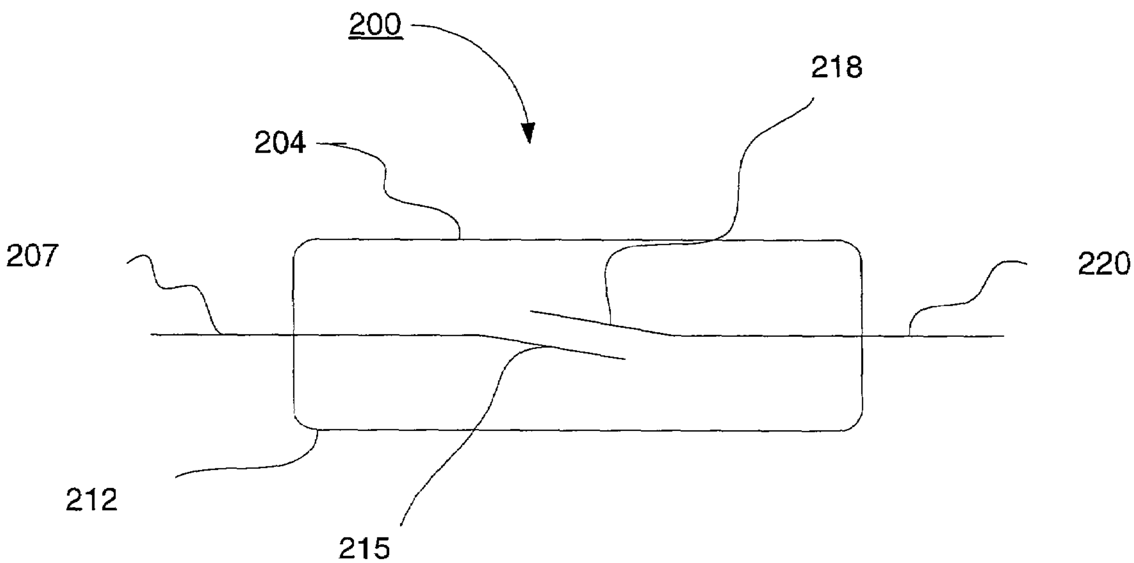
FIG. 7 is an illustration of a reed switch.

Alternatively the reed switch 161 can be placed in the power cord 165 when the magnet 158 is in the handset 152. In another embodiment the reed switch 161 can be placed in the mobile handset 152 and the magnet can be placed in the power cord 165. FIG. 7 shows a simplified example of a reed switch 200. The reed switch 200 is made up of a reed switch enclosure 212 that contains a first reed 207 and a second reed 218. Each reed 207, 218 is attached at one end and there is a slight separation between the two in the middle. When the reed switch 200 is placed in a magnetic field, the field pulls the two reeds 207, 218 together completing the circuit. The reed switch is connected to external circuitry by a first reed switch lead 215 and a second reed switch lead 220. It will be clear to one of skill in the art that a reed switch 200 could be devised that would be an open circuit when placed in a magnetic field and a closed circuit when not in a magnetic field. It will also be clear to one of skill in the art that such a reed switch can be used with minor circuitry modifications.

One skilled in the art will appreciate that the reed switch 200 can be replaced by a hall effect sensor. The hall effect sensor responds to a magnetic field and produces an analog or digital output proportional to the strength of the magnetic field. The output is used to set the state of the hands-free car kit between hands-free and privacy mode. An advantage of using the hall effect sensor is that hall effect sensors are currently smaller than reed switches. Hall effect sensors however, require more circuitry.

The description and drawings show a permanent magnet used to activate the reed switch or hall effect sensor. It will be clear to one skilled in the art that the magnet does not have to be a permanent magnet. The magnet could be an electromagnet. However a permanent magnet has the advantage of not needing to be supplied power as an electromagnet would.

The description and drawings contained herein are particular embodiments of the invention and are representative of the subject matter broadly contemplated by the invention. However, the invention encompasses other embodiments that will be apparent to those skilled in the art. Accordingly, the scope of the invention is limited only by the appended claims.

What is claimed is:

1. An accessory for a mobile communications device comprising:

a cradle adapted to receive a mobile handset;

a power cord capable of being removably attached to the mobile handset;

a reed switch placed in the power cord;

a magnet placed in the cradle;

a control circuit coupled to the reed switch for sensing and transmitting a state of the reed switch;

a speaker configured to be heard from several feet away coupled to the control circuit adapted to change states based on the state of the reed switch;

a microphone coupled to the control circuit adapted to change states based on the state of the reed switch;

wherein the magnet is adapted to change states of the reed switch based on proximity and orientation of the magnet to the reed switch.

2. The accessory as in claim 1 wherein the magnet is an electromagnet.

3. The accessory as in claim 1 wherein the magnet contains permanently magnet materials.

4. An accessory for a mobile communications device comprising:

a cradle adapted to receive a mobile handset;

a power cord capable of being removably attached to the mobile handset;

a reed switch placed in the cradle;

a magnet placed in the power cord;

a control circuit coupled to the reed switch for sensing and transmitting a state of the reed switch;

a speaker configured to be heard from several feet away coupled to the control circuit adapted to change states based on the state of the reed switch;

a microphone coupled to the control circuit adapted to change states based on the state of the reed switch;

wherein the magnet is adapted to change states of the reed switch based on proximity and orientation of the magnet to the reed switch.

5. An accessory for a mobile communications device comprising:

a mobile handset;

a power cord capable of being removably attached to the mobile handset;

a reed switch placed in the power cord;

a magnet mounted so the reed switch may be selectively activated by the magnet;

a control circuit coupled to the reed switch for sensing and transmitting a state of the reed switch;

a speaker configured to be heard from several feet away coupled to the control circuit adapted to change states based on the state of the reed switch;

a microphone coupled to the control circuit adapted to change states based on the state of the reed switch;

wherein the magnet is adapted to change states of the reed switch based on proximity and orientation of the magnet to the reed switch.

* * * * *